United States Patent
Liu (10) Patent No.: US 11,797,680 B2
(45) Date of Patent: Oct. 24, 2023

(54) DEVICE WITH CHAIN OF TRUST

(71) Applicant: Micron Technology, Inc., Boise, ID (US)

(72) Inventor: Zhan Liu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 187 days.

(21) Appl. No.: 17/006,182

(22) Filed: Aug. 28, 2020

(65) Prior Publication Data
US 2022/0067164 A1    Mar. 3, 2022

(51) Int. Cl.
G06F 21/57     (2013.01)
H04L 9/30     (2006.01)
G06F 21/44     (2013.01)

(52) U.S. Cl.
CPC ............ G06F 21/575 (2013.01); G06F 21/44 (2013.01); H04L 9/3073 (2013.01); *G06F 2221/034* (2013.01)

(58) Field of Classification Search
CPC ...... G06F 21/44; G06F 21/572; G06F 21/575; G06F 21/64; G06F 2221/034; H04L 9/0643; H04L 9/3073; H04L 9/3236
See application file for complete search history.

(56) References Cited

U.S. PATENT DOCUMENTS

| | | | | |
|---|---|---|---|---|
| 9,792,440 | B1* | 10/2017 | Wang | H04L 63/1466 |
| 2006/0155988 | A1* | 7/2006 | Hunter | G06F 21/575 |
| | | | | 713/164 |
| 2008/0126779 | A1* | 5/2008 | Smith | G06F 21/575 |
| | | | | 713/2 |
| 2014/0040636 | A1* | 2/2014 | Jeansonne | G06F 21/575 |
| | | | | 713/189 |
| 2015/0019793 | A1* | 1/2015 | Dover | G06F 21/57 |
| | | | | 711/103 |
| 2016/0182238 | A1* | 6/2016 | Dewan | H04L 9/321 |
| | | | | 713/193 |
| 2019/0163497 | A1* | 5/2019 | Samuel | G06F 11/1469 |
| 2020/0042709 | A1* | 2/2020 | Fu | H04L 9/0643 |
| 2020/0067987 | A1* | 2/2020 | Haid | G06F 21/57 |
| 2021/0303691 | A1* | 9/2021 | Dewan | G06F 21/572 |

OTHER PUBLICATIONS

L. H. Adnan, H. Hashim, Y. M. Yussoff and M. U. Kamaluddin, "Root of trust for trusted node based-on ARM11 platform," The 17th Asia Pacific Conference on Communications, 2011, pp. 812-815, doi: 10.1109/APCC.2011.6152919. (Year: 2011).*

* cited by examiner

*Primary Examiner* — Michael Simitoski
(74) *Attorney, Agent, or Firm* — Holland & Hart LLP (57) ABSTRACT

Methods, systems, and devices to enable a device with chain of trust are described. A controller may authenticate a root of trust entity as part of a boot-up procedure of a system that includes the root of trust entity. The root of trust entity may receive, as part of the boot-up procedure, a first portion of code associated with a first entity of the system. The controller may generate a first measurement result of the first portion of code and may identify, by the root of trust entity, a second measurement result associated with the first portion of code. The controller may determine, by the root of trust entity, whether the first measurement result matches the second measurement result as part of authenticating the first portion of code and may transmit, by the root of trust entity, an indication of whether the first and second measurement results match.

18 Claims, 5 Drawing Sheets

DEVICE WITH CHAIN OF TRUST

BACKGROUND

The following relates generally to one or more systems for memory and more specifically to a device with chain of trust.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

When a device is powered on, the device may boot up according to a boot sequence. Performing the boot sequence may involve booting up hardware and/or initializing one or more of firmware and software for the device. At least some of the code that is initialized (e.g., code corresponding to a basic input/output system (BIOS), bootloader or an operating system) may be authenticated prior to initialization. This authentication may occur to ensure that the code has not been tampered with before the device has been booted up.

In some examples, the code itself may include instructions for performing authentication on additional code that is loaded by the code. However, in some examples, a portion of the code corresponding to performing this authentication process may be tampered with by an unauthorized user. Additionally, as part of authenticating the additional code, the code may include instructions for checking the signature of the additional code. Different entities that are initiated as part of the boot sequence may each have their own authentication or validation process. Having multiple authentication processes may make portions of the entities or code more susceptible to being tampered with by an unauthorized user.

System, devices, and techniques may include a root of trust (ROT) entity that is configured to authenticate code prior to initializing the code. Centralizing authentication procedures for a boot sequence with a single entity (e.g., the ROT entity) may improve the security of the boot sequence and reduce the likelihood of tampering. The ROT entity may receive code from a different entity associated with the boot sequence and may use the received code to generate a first measurement result (e.g., a hash). The ROT entity may compare the first measurement result with a second measurement result associated with an untampered version of the received code. Additionally, the ROT entity itself may be associated with a public key corresponding to the user of the device. As such, instead of using multiple public keys to check signatures, one public key may be used (e.g., that of the ROT entity). Additionally, the way in which the ROT entity checks the code may be configurable.

Features of the disclosure are initially described in the context of systems and end device configurations as described with reference to FIGS. 1 and 2A. Features of the disclosure are described in the context of an initialization procedure and process flow as described with reference to FIGS. 2B and 3. These and other features of the disclosure are further illustrated by and described with reference to an apparatus diagram and a flowchart that relate to a device with chain of trust as described with reference to FIGS. 4 and 5.

Figure 1:
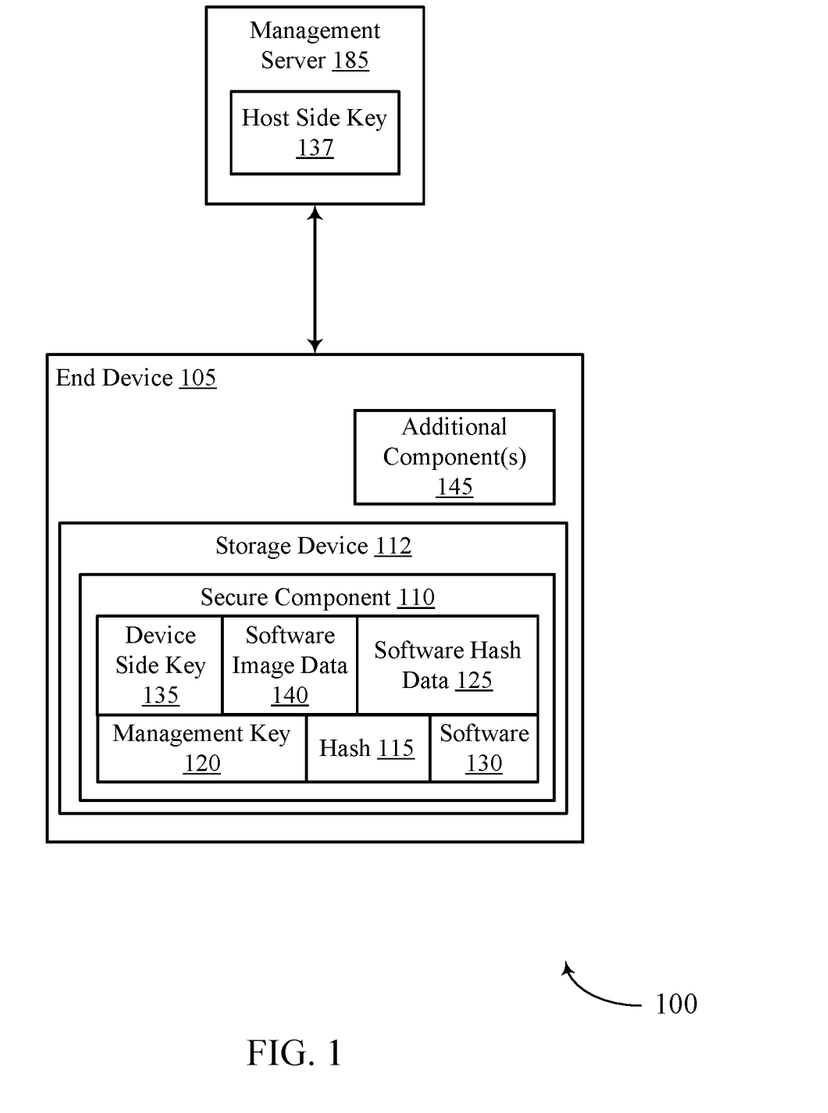
FIG. 1 illustrates an example of a system that supports enablement of a device with chain of trust in accordance with examples as disclosed herein.

FIG. 1 illustrates an example of a system 100 that supports authenticating software images in accordance with examples as disclosed herein. The system 100 may include an end device 105 and a management server 185.

The end device 105 may include a storage device 112 and one or more additional components 145. In some cases, the end device 105 may include a hypervisor. The storage device may include a secure component 110 that is configured to securely store at least a device side key 135, software image data 140, and software hash data 125. In some cases, the secure component 110 may store a management key 120. The device side key 135 may be an example of a server root key (SRK) or a set of two keys such as a management public key and a device private key. The server root key or management public key may allow an entity in possession of a copy of the SRK or the management private key to manage the secure component 110 by turning on a security feature of the secure component 10. The storage device 112 may include one or more components associated with a memory device that are operable to perform one or more authentication procedures as discussed herein. The end device 105 may be an example of a computing system of a vehicle, an infotainment system of a vehicle, a personal computer, a portable electronic device, a server, or any other type of computing device.

The storage device 112 can be integrated into an end device 105, which may include a hypervisor interacting with the storage device 112. The hypervisor can be implemented in hardware or software and is used at least in part to load software images from the storage device 112 for running one or more virtual machines on the end device 105. Prior to running a virtual machine on the end device 105, the hypervisor may verify with the storage device 112 whether the virtual machine's software image has been tampered with, and elect not to run the virtual machine its code has been modified by a malicious actor.

In some examples, the storage device 112 may include one or more software images. Before the software images may run (e.g., before booting the software images), the image(s) may be authenticated to ensure that the underlying code has not been unintentionally altered. During a first portion of authenticating the image(s), the management server 185 or any entity in possession of host side key(s) 137 may issue a secure command to the secure component 110 to calculate and store a hash 115 (e.g., a golden software hash) based on software image data 140 and device side key(s) 135. During a subsequent portion of authenticating the image(s), the storage device 112 may calculate a hash based on the software image data 140 (e.g., the current data) of the image being authenticated. The storage device 112 may compare the hash to the hash 115 to authenticate the software image.

The system 100 may include a management server 150 that is in communication with the end device 105. The management server 150 may include at least a first software image, a second software image and host side key(s) 137. The host side key 137 may be an example of an SRK or a set of two keys, such as a management private key and a device public key. When the management server 185 downloads software image data into the storage device 112, it may also issue a secure command to the secure component 110 to generate the hash 115. In some examples, the management server 185 may elect to produce a patch file representing differences between a first software image and a second software image. The management server 185 may then elect to download the patch file into the software image data 140 component of the storage device 112.

In some examples, the end device 105 may be configured to authenticate code prior to initializing the code. The end device 105 may use received code to generate a first measurement result (e.g., a hash) and may compare the first measurement result with a second measurement result associated with an untampered version of the received code. Additionally, the end device 105 or a component thereof may be associated with a public key corresponding to the user of the device (e.g., the management server 185). As such, instead of using multiple public keys to check signatures, one public key may be used (e.g., that of the end device 105 or the component thereof). Additionally, the way in which the end device 105 checks the code may be configurable.

The system 100 may include any quantity of non-transitory computer readable media that support a device with a chain of trust. For example, the end device 105, the storage device 112, the management server 185, or any combination thereof may include or otherwise may access one or more non-transitory computer readable media storing instructions (e.g., firmware) for performing the functions ascribed herein to the end device 105, the storage device 112, or the management server 185. For example, such instructions, when executed by the end device 105, the storage device 112, or the management server 185 may cause the end device 105, the storage device 112, or the management server 185 to perform associated functions as described herein.

Figure 2A:
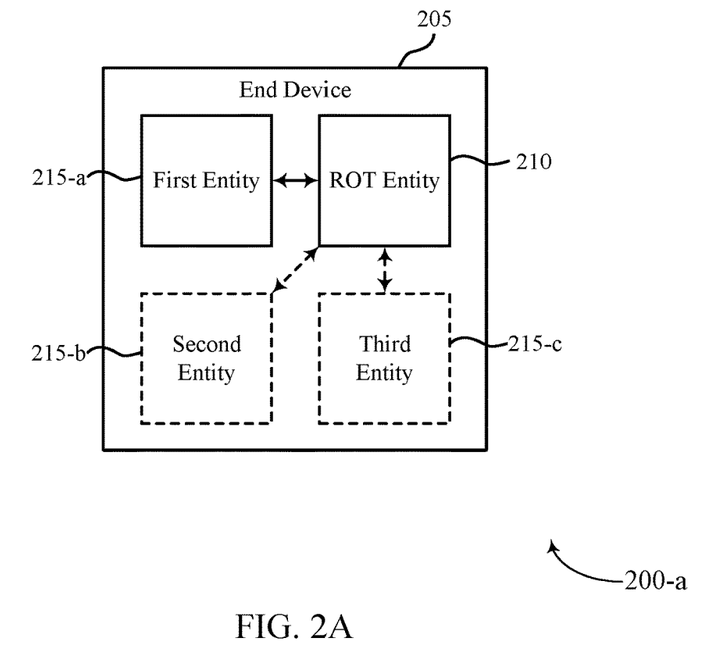
FIG. 2A illustrates an example of an end device configuration that supports enablement of a device with chain of trust in accordance with examples as disclosed herein.
Figure 2B:
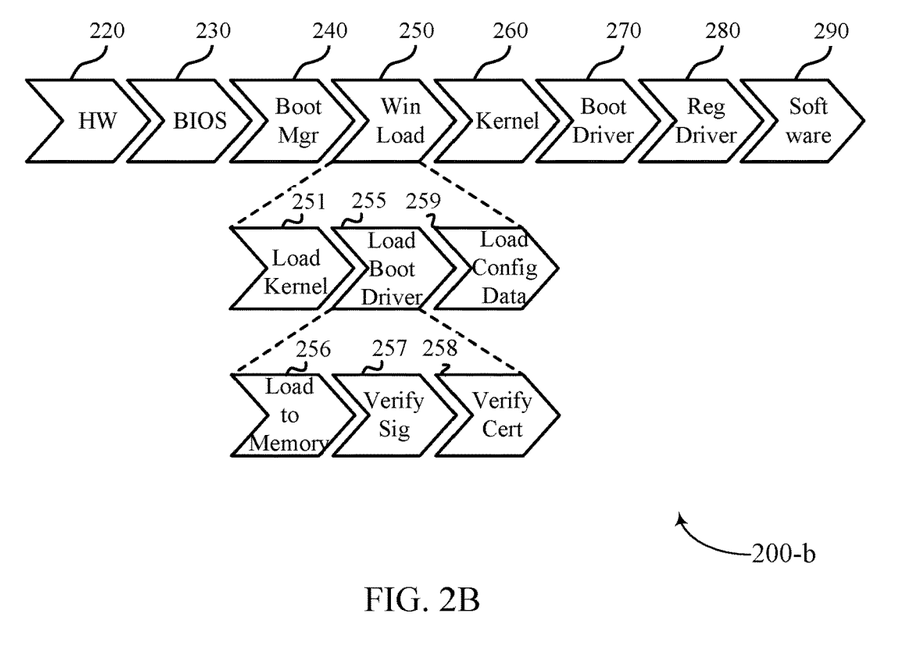
FIG. 2B illustrates an example of an initialization procedure that supports enablement of a device with chain of trust in accordance with examples as disclosed herein.

FIG. 2A illustrates an example of an end device configuration 200-a and FIG. 2B illustrates an example of an initialization procedure 200-b that supports enablement of a device with chain of trust in accordance with examples as disclosed herein. In some examples, end device configuration 200-a may be implemented by aspects of FIG. 1. For example, End device 205 may be an example of an end device 105 as described with reference to FIG. 1.

End device configuration 200-a may include an end device 205. The end device 205 may include a ROT entity 210 and one or more other entities 215. For instance, end device 205 may include a first entity 215-a, a second entity 215-b, and a third entity 215-c. The ROT entity 210 may be coupled with each of the one or more other entities 215. For instance, the ROT entity 210 may be coupled with first entity 215-a via a first interface (e.g., a first bus or set of pins), coupled with a second entity 215-b via a second interface (e.g., a second bus or set of pins), and coupled with a third entity 215-c via a third interface (e.g., a third bus or set of pins).

The ROT entity 210 may be configured to authenticate code associated with the other entities 215. Such code may, for instance, include images for the other entities 215 which may, where each of the other entities 215 may include a BIOS, a kernel, a system loader, a bootloader, an operating system, a boot driver, a regular driver, or any combination thereof.

In some examples, the end device 205 may boot according to a boot sequence. For instance, at stage 220, the end device 205 may be supplied with or connected to power and hardware involved in booting up may be initialized. At stage 230, the BIOS may be initialized and may, in turn, initialize a boot manager at stage 240. The BIOS may check the validation of code and/or other data (e.g., critical data). The boot manager may initialize a system loader (e.g., winload) at stage 250 and the system loader, in turn, may initialize a kernel at stage 260. The kernel, at stage 270, may initialize one or more boot drivers, and the one or more boot drivers may initialize one or more regular drivers at stage 280. For instance, the kernel may operate to initialize an anti-malware (AM), driver, to perform AM driver register callbacks, and to initialize the boot drivers. Initializing the one or more boot drivers may be administrator-definable and may involve the kernel performing a kernel callback to the AM drivers, the AM driver checking the one or more boot drivers, and the kernel determining whether to initialize the one or more boot drivers or determining to skip the initializing. The kernel and/or the one or more boot drivers may perform handoff to a runtime driver after the one or more boot drivers are initialized. The regular drivers initialized by the boot drivers may initialize other software at stage 290. In some examples, the system loader may load code for the kernel at sub-stage 251, code for the one or more boot drivers at sub-stage 255, and related configuration data at sub-stage 259.

In some examples, as part of loading the boot drivers, the system loader may load code corresponding to the boot drivers to memory at sub-stage portion 256. The system loader may verify a signature (e.g., a public key) of the code at sub-stage portion 257 and may verify a certificate of the code at sub-stage portion 258. Performing this verification (or authentication) may enable the system loader to ensure that the code has not been tampered with. Additionally or alternatively, the kernel may check the validation of each boot driver.

Other codes (e.g., those corresponding to the BIOS, the boot manager, the kernel, the boot drivers, the regular drivers, or any combination thereof) may perform similar verification methods on additional code loaded by the other codes. For instance, the boot manager (e.g., BIOS) may have a public key in the boot manager code or saved in a write-protected ROM (e.g., serial-flash (SF) memory). When the boot manager (e.g., u-boot) boots up, the boot manager may use the public key to check the validity of a boot image (e.g., an operating system if the boot manager boots up the operating system) by comparing the public key to a private key associated with the boot image. As such, the boot manager may have a secure boot capability (e.g., the capability to check the signature of images loaded by the boot manager, such as an operating system). Each code operating in this manner may achieve a chain of trust (COT) and may be used to achieve a secure boot.

However, in some examples, a portion of the code used for performing authentication may be tampered with by an unauthorized user. Additionally, the public-private key pair associated with a first portion of the code (e.g., a system loader) may be different from a public-private key pair associated with a second portion of the code loaded by the first portion of the code (e.g., a kernel or a boot driver). Such difference in the key pairs may be due, for instance, to different portions of the code being associated with different vendors or companies. As such, the end device 205 may track an increased quantity of key pairs or may be unable to authenticate the second portion of the code, which may be associated with an increased security risk. Additionally, the way in which the signatures of code may be verified may not be configurable, as the instructions for performing the verification may be included in the code.

To mitigate these issues, the ROT entity 210 may be configured to authenticate code prior to validating the code to operate as part of the boot sequence. The ROT entity 210 may use the received code to generate a first measurement result (e.g., a hash) and may compare the first measurement result with a second measurement result associated with an untampered version of the received code. Additionally, the ROT entity 210 itself may be associated with a public key corresponding to the user of the device. Additionally, the way in which the ROT entity 210 checks the code may be configurable.

In some examples, the end device 205 may have one or more non-volatile registers (e.g., storage) at which the end device 205 may save measurement configuration data and/or measurement results. For instance, the ROT entity 210 may include one or more platform configuration registers (PCR) that are used for performing measurements. For instance, a first of the one or more PCRs may be used to perform auto-measurement and one or more external PCRs of the one or more PCRs may be used for stage measurements. The measurement policy that triggers performing measurements using the one or more PCRs may be configurable. Additionally, the ROT entity 210 may include one or more core root of trust for measurement (CRTM) registers. The CRTM registers may be non-volatile and may store locations and/or sizes for measurements. Additionally, the CRTM registers may have read/write protection. The values stored at the CRTM registers and/or whether the CRTM registers are read/write protected may be changed and/or configured via secure commands (e.g., secure commands with the user). In some examples, the locations and/or sizes stored at the CRTM registers may be used to implement a measurement policy (e.g., by defining the measured code and a data location and size). The end device 205 and the user (e.g., a server) may communicate via authenticated commands, which may be used to securely change the measurement configuration data.

The ROT entity 210 of the end device 205 may be associated with a key pair (e.g., its own public key and its own private key). Additionally, the ROT entity 210 may have a public key of the user of the end device 205 (e.g., a server). In some examples, the ROT entity 210 may use a physical unclonable function (PUF) to generate its public and private key pair enabling the device to send a secure command to the server. The ROT entity 210 may have a public key for the server saved in the end device 205 which is write-protected. The user (e.g., a server) with which the end device 205 may communicate may use a corresponding server private key to send secure commands to the end device 205. Such secure commands may set up and change a configuration of the end device 205 and/or of the ROT entity 210, which may include values for a CRTM register, a protection feature, a measurement policy, or a combination thereof. In some examples, firmware, a device driver, or data from a third party (e.g., code) may be trustable and may be indicated to the end device 205 in a secure and trusted way. In such examples, a measurement policy and/or configuration for a CRTM register may be indicated for the code and a measurement for the code may be saved in a PCR or a write-protected area in the end device 205. Ways in which the write-protection feature may be changed may include removing write protection or writing values and setting the write protection.

In some examples, code that is to be authenticated and loaded may be added to a measurement configuration policy managed by the ROT entity 210 and/or the end device 205 including the ROT entity 210-*a*. The code may be transmitted to the device (e.g., from a server) via a secure command. The ROT entity 210 may perform a measurement on some or each instances of code to generate one or more measurement results (e.g., hashes) when the code is first imported to the end device 205 and may save the measurement result at the end device 205 or may send the measurement result to a server (e.g., a remote attestation server) via attestation. Attestation may involve a client machine (e.g., an end device including the ROT entity 210-*a*) providing evidence about its state to a remote computer or server. For instance, the client machine may transmit trusted platform module (TPM) PCR values to a remote computer or server in a trusted way (e.g., using secure commands as described herein). At boot-up, each instance of code may be checked for integrity and the end device 205 may refrain from loading any instances of code that are tampered with.

Code and data may be stored in a protected area of a device or at a remote server and may, thus, remain unchanged for generating a corresponding measurement result. In some examples, a measure command supported by the end device 205 may be used to check the integrity of code and data. The end device 205 may control the boot up sequence validation check using a remote attestation server and/or one or more PCRs (e.g., PCR0 and external PCRs).

Figure 3:
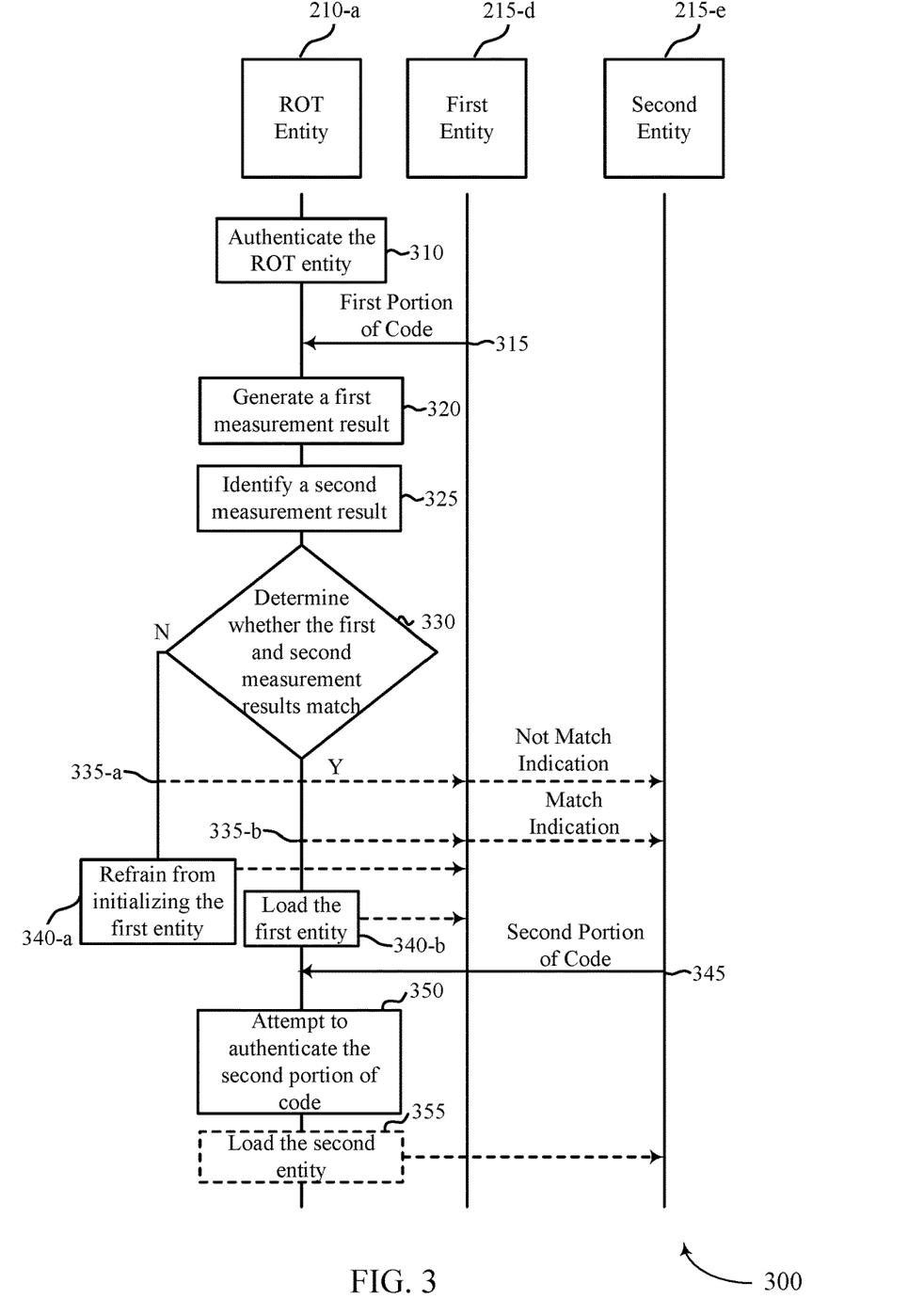
FIG. 3 illustrates an example of a process flow that supports enablement of a device with chain of trust in accordance with examples as disclosed herein.

FIG. 3 illustrates an example of a process flow 300 that supports enablement of a device with chain of trust in accordance with examples as disclosed herein. In some examples, process flow 300 may be implemented by aspects of FIG. 2A. For instance, ROT entity 210-*a* may be an example of a ROT entity as described with reference to FIG. 2, and first entity 215-*d* and second entity 215-*e* may be examples of entities 215 as described with reference to FIG. 2. In some cases, the ROT entity 210-*a* may refer to the ROT entity 210-*a*, an end device including the ROT entity 210-*a*, or a controller of the end device, or a combination thereof.

At 310, the ROT entity 210-*a* may be authenticated as part of a boot-up procedure of a system that includes the root of trust entity (e.g., an end device 105 or 205). For instance, an end device (e.g., an end device 205), the ROT entity 210-*a*, or a controller of the end device may authenticate the ROT entity 210-*a*. In some examples, the ROT entity 210-*a* may achieve ROT by performing auto-measurement and recovery. Such measures may cover each image involved in a boot sequence. If an image gets tampered, the measure may fail and the system including the ROT entity 210-*a* may not boot. Instead, the system may fall in or enter a recovery state. As such, if successful, each of the images authenticated according to this measure may be valid. However, if one image is tampered, the system may not boot. To enable potential boot-up even if one image is tampered, the ROT entity 210-*a* may achieve a COT according to measurements that are set up for each stage as described according to the methods herein (e.g., 315 through 350). In some examples, authenticating the ROT entity 210-*a* may involve ROT entity 210-*a*, the end device including the ROT entity 210-*a*, or the controller of the end device loading an initial portion of code (i.e., code 1) and performing an auto-measurement on code 1. If the measurement is successfully, boot-up may continue and the ROT entity 210-*a* may become an ROT device. In such examples, the ROT entity 210-*a* may load a second instance of code (e.g., the first portion of code as described at 315). However, if the measurement is unsuccessful, boot-up may be stopped and the end device including the ROT entity 210-*a* may enter a recovery state.

At 315, as part of the boot-up procedure, a first portion of code (i.e., code 2) associated with a first entity 215-*d* of the system may be received. For instance, the first entity 215-*d* may transmit the first portion of code to the ROT entity 210-*a*. In some examples, the ROT entity 210-*a*, the end device, or the controller of the end device may receive the first portion of code based on authenticating the ROT entity 210-*a*. In some examples, the ROT entity 210-*a*, the end device, or the controller of the end device may be associated with a pair of keys that includes a public key and a private key. In some such examples, the ROT entity 210-*a*, the end device, or the controller of the end device may receive the first portion of the code using the pair of keys.

At 320, a first measurement result (e.g., a hash) of the first portion of code associated with the first entity 215-*d* may be generated based on receiving the first portion of code. For instance, the ROT entity 210-*a* may generate the first measurement result. In some examples, the ROT entity 210-*a*, the end device, or the controller of the end device generating the first measurement result may be triggered by receiving the first portion of code. In some examples, the ROT entity 210-*a*, the end device, or the controller of the end device generating the first measurement result may involve hashing the first portion of code to generate a hash.

At 325, a second measurement result (e.g., another hash) associated with the first portion of code associated with the first entity 215-*d* may be identified based on generating the first measurement result. For instance, the ROT entity 210-*a* may identify the second measurement result. In some examples, the ROT entity 210-*a*, the end device, or the controller of the end device may retrieve the second measurement result from memory associated with the ROT entity 210-*a*. In such examples, identifying the second measurement result may be based on retrieving the second measurement result. Additionally or alternatively, the ROT entity 210-*a*, the end device, or the controller of the end device may generate the second measurement result using a version of the first portion of code that has a confidence parameter that satisfies a threshold. In such examples, identifying the second measurement result may be based on generating the second measurement result. Additionally or alternatively, the ROT entity 210-*a*, the end device, or the controller of the end device may retrieve a version of the first portion of code from memory associated with the ROT entity 210-*a*, the end device, or the controller of the end device and stored prior to receiving the first portion of the code and may generate the second measurement result using the version of the first portion of the code after receiving the first portion of code and based on retrieving the version of the first portion of the code. In such examples, identifying the second measurement result may be based on generating the second measurement result.

At 330, whether the first measurement result matches the second measurement result may be determined as part of authenticating the first portion of code associated with the first entity 215-*d* as part of the boot-up procedure. For instance, the ROT entity 210-*a* may determine whether the first measurement result matches the second measurement result.

If, at 330, it is determined (e.g., by the ROT entity 210-*a*) that the first measurement result does not match the second measurement result, authentication of the first portion of the code may fail. In some such examples, at 335-*a*, the ROT entity 210-*a* may transmit an indication that the first measurement result does not match the second measurement result. Additionally, at 340-*a*, the ROT entity 210-*a* may cause the first portion of code to refrain from initializing and may stop boot (e.g., the end device including ROT entity 210-*a* may enter a recovery state based on a configured setting). However if, at 330, it is determined (e.g., by the ROT entity 210-*a*) that the first measurement result does match the second measurement result, authentication of the first portion of code may be successful. In some such examples, at 335-*b*, the ROT entity 210-*a* may transmit an indication that the first measurement result does match the second measurement result. Additionally, at 340-*b*, the ROT entity 210-*a* may cause the first portion of code of the first entity 215-*d* to initialize as part of the boot-up procedure (e.g., the ROT entity 210-*a* may continue boot) and a COT may be achieved.

At 345, a second portion of code (i.e., code 3) associated with a second entity 215-*e* may be received based on authenticating the first portion of code associated with the first entity 215-*d*. For instance, the second entity 215-*e* may transmit the second portion of code to ROT entity 210-*a*.

At 350, an attempt to authenticate the second portion of code may occur. For instance, the ROT entity 210-*a* may attempt to authenticate the second portion of code. In some examples, the ROT entity 210-*a*, the end device, or the controller of the end device may generate a third measurement result associated with the second entity 215-*e* based on receiving the second portion of code. Additionally, the ROT entity 210-*a*, the end device, or the controller of the end device may identify a fourth measurement result associated with the second portion of code associated with the second entity 215-*e*. Additionally, the ROT entity 210-*a*, the end device, or the controller of the end device may determine by the root of trust entity, whether the third measurement result matches the fourth measurement result as part of authenticating the second portion of code associated with the second entity 215-*e* as part of the boot-up procedure. The ROT entity 210-*a* may transmit an indication of whether the third measurement result matches the fourth measurement result (e.g., to a server or to the one or more other entities).

In some examples, the first portion of code of the first entity 215-*d* may initialize prior to generating the third measurement result. For instance, for each portion of code that is loaded or received by the ROT entity 210-*a*, the ROT entity 210-*a* may initialize portions of code for which corresponding measurement results match until the ROT entity 210-*a* loads a portion of code (i.e., code n, where n is an integer equal to or greater than 1) for which the measurement results do not match. At code n, the ROT entity 210-*a* may stop boot-up. In some examples, the ROT entity 210-*a* may identify the stage associated with code n as a tampered stage. Initializing the first portion of code prior to generating the third measurement result may enable a quicker boot time.

Alternatively, the first portion of code of the first entity 215-*d* may initialize after determining whether the third measurement result matches the fourth measurement result. For instance, for each portion of code that is loaded or received by the ROT entity 210-*a*, the ROT entity 210-*a* may refrain from initializing portions of code for which corresponding measurement results match until the ROT entity 210-*a* loads a portion of code (i.e., code n, where n is an integer equal to or greater than 1) for which the measurement results do not match or until each portion of code has been successfully loaded. At code n, the ROT entity 210-*a* may initialize portions of code for which the corresponding measurement results match (i.e., code 1 to code n–1). In some such examples, the ROT entity 210-*a* may auto-measure according to a measure policy for each portion of code. In some examples, the ROT entity 210-*a* may identify the stage associated with code n as a tampered stage. Initializing the first portion of code after determining whether the third measurement result matches the fourth measurement result may be performed with measurement control logic that has reduced complexity.

Aspects of the process flow 300 may be implemented by a controller, among other components. Additionally or alternatively, aspects of the process flow 300 may be implemented as instructions stored in memory (e.g., firmware stored in a memory coupled with the ROT entity 210-*a*). For example, the instructions, when executed by a controller (e.g., a controller coupled with the ROT entity 210-*a*), may cause the controller to perform the operations of the process flow 300.

Performing the methods as described herein may have one or more advantages. For instance, due to ROT entity 210-*a* performing authentication (e.g., a measure and check of code integrity), the codes that are being authenticated may avoid performing verification and validity checks. Thus, the ROT entity 210-*a* may determine the validity of images and their corresponding signatures; may perform measurements and save measurements at the device or send the measurements to a remote attestation server; and may add measurement policies to valid images (e.g., third party images determined to be valid). Additionally, a secure boot may be performed using the ROT entity 210-*a* and not according to code being verified. As such, the code being verified may not have a secure boot capability and may thus be reduced in size. Additionally, one (e.g., instead of multiple) key pair may be used to send secure commands between a user (e.g., a server) and the end device including the ROT entity 210-*a*.

Additionally, code which is deemed to be trustful (e.g., authenticated code) may be added to a measurement policy by an owner of the end device including the ROT entity 210-*a*. Additionally, code, including legacy code, which has no secure boot feature may be used for performing a secure boot. Additionally, write-protection for an image location may be provided and may be changed using secure commands. Additionally, the location, size, and contents of measurements may be configurable as code and the data and/or configuration used by the code may be measured. Additionally, if the configuration changes, a new measurement may be made.

Figure 4:
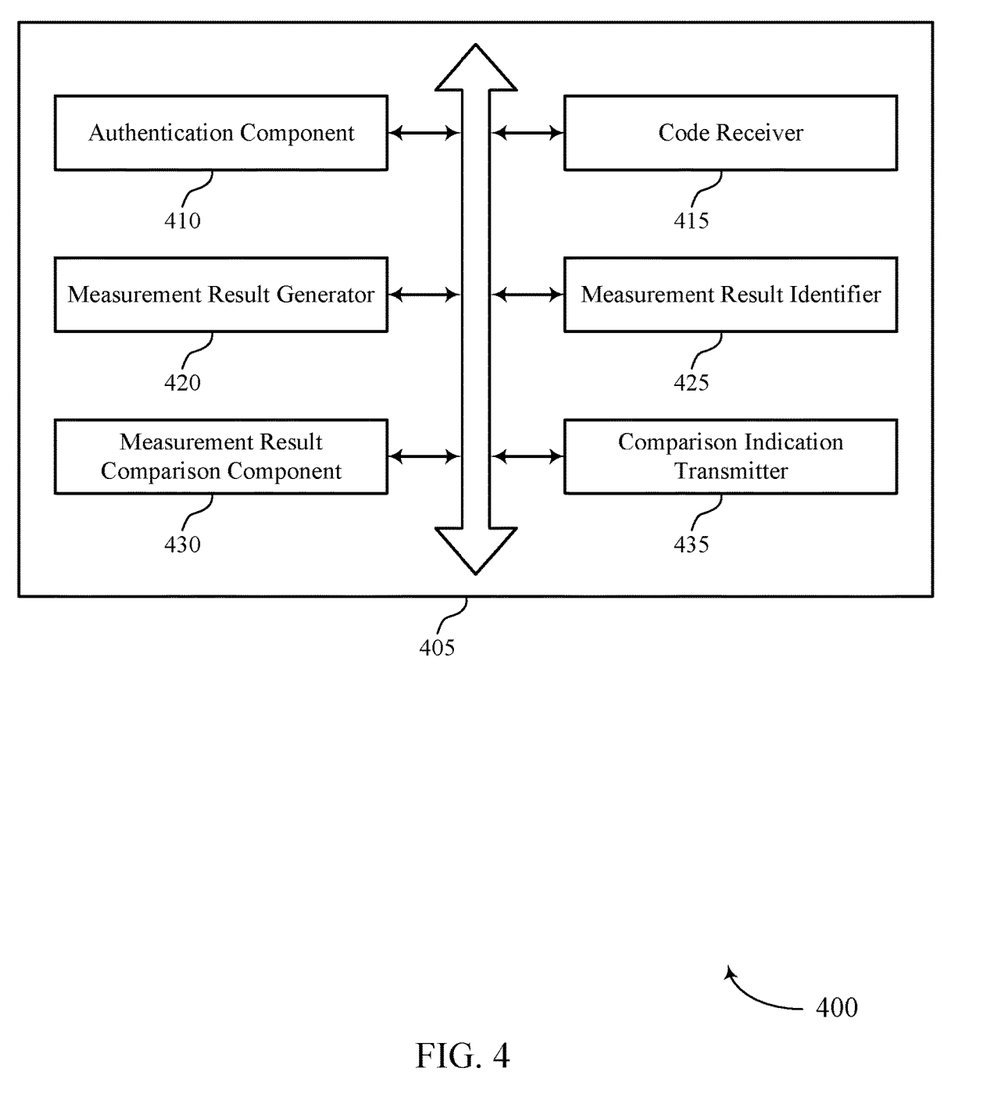
FIG. 4 shows a block diagram of a system that supports enablement of a device with chain of trust in accordance with examples as disclosed herein.

FIG. 4 shows a block diagram 400 of a system 405 that supports enablement of a device with chain of trust in accordance with examples as disclosed herein. The system 405 may be an example of aspects of a system, an end device (e.g., an end device 105 as described with reference to FIG. 1 or an end device 205 as described with reference to FIG. 2), an ROT entity (e.g., an ROT entity 210 as described with reference to FIG. 2), or a controller of the end device (e.g., an coupled with the ROT entity) as described with reference to FIGS. 1 through 3. The system 405 may include an authentication component 410, a code receiver 415, a measurement result generator 420, a measurement result identifier 425, a measurement result comparison component 430, and a comparison indication transmitter 435. Each of these modules may communicate, directly or indirectly, with one another (e.g., via one or more buses).

The authentication component 410 may authenticate a root of trust entity as part of a boot-up procedure of a system that includes the root of trust entity. In some examples, the authentication component 410 may authenticate, by the root of trust entity, the first portion of code associated with the first entity based on the first measurement result matching the second measurement result, where the indication transmitted by the root of trust entity causes the first portion of code of the first entity to initialize as part of the boot-up procedure of the system. In some examples, the authentication component 410 may fail to authenticate, by the root of trust entity, the first portion of code associated with the first entity based on the first measurement result failing to match the second measurement result, where the indication transmitted by the root of trust entity causes the first portion of code of the first entity to refrain from initializing as part of the boot-up procedure of the system. In some cases, the first portion of code of the first entity initializes prior to generating a third measurement result associated with a second entity. In some cases, the first portion of code of the first entity initializes after determining whether a third measurement result associated with a second entity matches a fourth measurement result associated with a second portion of code.

The code receiver 415 may receive, by the root of trust entity and as part of the boot-up procedure of the system, a first portion of code associated with a first entity of the system based on authenticating the root of trust entity. In some examples, the code receiver 415 may receive, by the root of trust entity and as part of the boot-up procedure of the system, a second portion of code associated with a second entity of the system based on authenticating the first entity. In some cases, the root of trust entity is associated with a pair of keys that include a public key and a private key, and where the root of trust entity receives the first portion of code using the pair of keys.

The measurement result generator 420 may generate a first measurement result of the first portion of code associated with the first entity based on receiving the first portion of code. In some examples, the measurement result generator 420 may generate a third measurement result associated with the second entity based on receiving the second portion of code. In some examples, the measurement result generator 420 may generate the second measurement result using a version of the first portion of code associated with the first entity that has a confidence parameter that satisfies a threshold, where retrieving the second measurement result is based on generating the second measurement result. In some examples, the measurement result generator 420 may generate the second measurement result using the version of the first portion of code after receiving the first portion of code as part of the boot-up procedure and based on retrieving the version of the first portion of code, where identifying the second measurement result is based on generating the second measurement result. In some examples, the measurement result generator 420 may hash the first portion of code to generate a hash. In some cases, the first measurement result includes a hash.

The measurement result identifier 425 may identify, by the root of trust entity, a second measurement result associated with the first portion of code associated with the first entity based on generating the first measurement result. In some examples, the measurement result identifier 425 may identify, by the root of trust entity, a fourth measurement result associated with the second portion of code associated with the second entity based on generating the third measurement result. In some examples, the measurement result identifier 425 may retrieve the second measurement result from memory associated with the root of trust entity, where identifying the second measurement result is based on retrieving the second measurement result. In some examples, the measurement result identifier 425 may retrieve a version of the first portion of code from memory associated with the root of trust entity and stored prior to receiving the first portion of code.

The measurement result comparison component 430 may determine, by the root of trust entity, whether the first measurement result matches the second measurement result as part of authenticating the first portion of code associated with the first entity as part of the boot-up procedure. In some examples, the measurement result comparison component 430 may determine, by the root of trust entity, whether the third measurement result matches the fourth measurement result as part of authenticating the second portion of code associated with the second entity as part of the boot-up procedure.

The comparison indication transmitter 435 may transmit, by the root of trust entity, an indication of whether the first measurement result matches the second measurement result. In some examples, the comparison indication transmitter 435 may transmit, by the root of trust entity, an indication of whether the third measurement result matches the fourth measurement result.

Figure 5:
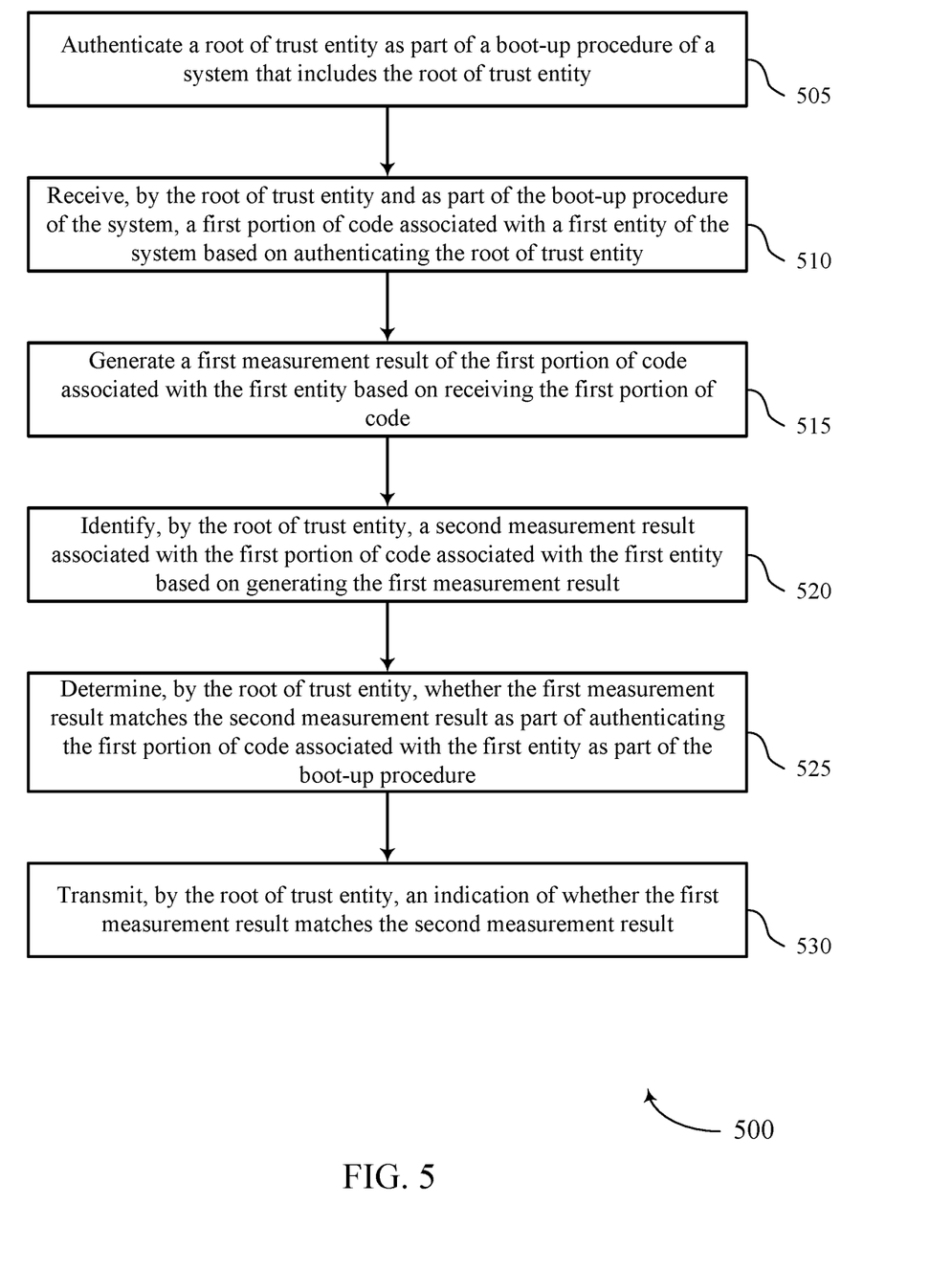
FIG. 5 shows a flowchart illustrating a method or methods that support a device with chain of trust in accordance with examples as disclosed herein.

FIG. 5 shows a flowchart illustrating a method or methods 500 that supports enablement of a device with chain of trust in accordance with examples as disclosed herein. The operations of method 500 may be implemented by a system, an end device (e.g., an end device 105 as described with reference to FIG. 1 or an end device 205 as described with reference to FIG. 2), an ROT entity (e.g., an ROT entity as described with reference to FIG. 2), a controller of the end device (e.g., and coupled with the ROT entity), or their components as described herein. For example, the operations of method 500 may be performed by a system as described with reference to FIG. 4. In some examples, a system may execute a set of instructions to control the functional elements of the system to perform the described functions. Additionally or alternatively, a system may perform aspects of the described functions using special-purpose hardware.

At 505, the system, the end device, the ROT entity, or the controller may authenticate a root of trust entity as part of a boot-up procedure of a system that includes the root of trust entity. The operations of 505 may be performed according to the methods described herein. In some examples, aspects of the operations of 505 may be performed by an authentication component as described with reference to FIG. 4.

At 510, the system, the end device, the ROT entity, or the controller may receive, by the root of trust entity and as part of the boot-up procedure of the system, a first portion of code associated with a first entity of the system based on authenticating the root of trust entity. The operations of 510 may be performed according to the methods described herein. In some examples, aspects of the operations of 510 may be performed by a code receiver as described with reference to FIG. 4.

At 515, the system, the end device, the ROT entity, or the controller may generate a first measurement result of the first portion of code associated with the first entity based on receiving the first portion of code. The operations of 515 may be performed according to the methods described herein. In some examples, aspects of the operations of 515 may be performed by a measurement result generator as described with reference to FIG. 4.

At 520, the system, the end device, the ROT entity, or the controller may identify, by the root of trust entity, a second measurement result associated with the first portion of code associated with the first entity based on generating the first measurement result. The operations of 520 may be performed according to the methods described herein. In some examples, aspects of the operations of 520 may be performed by a measurement result identifier as described with reference to FIG. 4.

At 525, the system, the end device, the ROT entity, or the controller may determine, by the root of trust entity, whether the first measurement result matches the second measurement result as part of authenticating the first portion of code associated with the first entity as part of the boot-up procedure. The operations of 525 may be performed according to the methods described herein. In some examples, aspects of the operations of 525 may be performed by a measurement result comparison component as described with reference to FIG. 4.

At 530, the system may transmit, by the root of trust entity, an indication of whether the first measurement result matches the second measurement result. The operations of 530 may be performed according to the methods described herein. In some examples, aspects of the operations of 530 may be performed by a comparison indication transmitter as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for authenticating a root of trust entity as part of a boot-up procedure of a system that includes the root of trust entity, receiving, by the root of trust entity and as part of the boot-up procedure of the system, a first portion of code associated with a first entity of the system based on authenticating the root of trust entity, generating a first measurement result of the first portion of code associated with the first entity based on receiving the first portion of code, identifying, by the root of trust entity, a second measurement result associated with the first portion of code associated with the first entity based on generating the first measurement result, determining, by the root of trust entity, whether the first measurement result matches the second measurement result as part of authenticating the first portion of code associated with the first entity as part of the boot-up procedure, and transmitting, by the root of trust entity, an indication of whether the first measurement result matches the second measurement result.

Some examples of the method 500 and the apparatus described herein may further include operations, features, means, or instructions for authenticating, by the root of trust entity, the first portion of code associated with the first entity based on the first measurement result matching the second measurement result, where the indication transmitted by the root of trust entity causes the first portion of code of the first entity to initialize as part of the boot-up procedure of the system.

Some examples of the method 500 and the apparatus described herein may further include operations, features, means, or instructions for receiving, by the root of trust entity and as part of the boot-up procedure of the system, a second portion of code associated with a second entity of the system based on authenticating the first entity, generating a third measurement result associated with the second entity based on receiving the second portion of code, identifying, by the root of trust entity, a fourth measurement result associated with the second portion of code associated with the second entity based on generating the third measurement result, determining, by the root of trust entity, whether the third measurement result matches the fourth measurement result as part of authenticating the second portion of code associated with the second entity as part of the boot-up procedure, and transmitting, by the root of trust entity, an indication of whether the third measurement result matches the fourth measurement result.

In some examples of the method 500 and the apparatus described herein, the first portion of code of the first entity initializes prior to generating the third measurement result.

In some examples of the method 500 and the apparatus described herein, the first portion of code of the first entity initializes after determining whether the third measurement result matches the fourth measurement result.

Some examples of the method 500 and the apparatus described herein may further include operations, features, means, or instructions for failing to authenticate, by the root of trust entity, the first portion of code associated with the first entity based on the first measurement result failing to match the second measurement result, where the indication transmitted by the root of trust entity causes the first portion of code of the first entity to refrain from initializing as part of the boot-up procedure of the system.

Some examples of the method 500 and the apparatus described herein may further include operations, features, means, or instructions for retrieving the second measurement result from memory associated with the root of trust entity, where identifying the second measurement result may be based on retrieving the second measurement result.

Some examples of the method 500 and the apparatus described herein may further include operations, features, means, or instructions for generating the second measurement result using a version of the first portion of code associated with the first entity that may have a confidence parameter that satisfies a threshold, where retrieving the second measurement result may be based on generating the second measurement result.

Some examples of the method 500 and the apparatus described herein may further include operations, features, means, or instructions for retrieving a version of the first portion of code from memory associated with the root of trust entity and stored prior to receiving the first portion of code, and generating the second measurement result using the version of the first portion of code after receiving the first portion of code as part of the boot-up procedure and based on retrieving the version of the first portion of code, where identifying the second measurement result may be based on generating the second measurement result.

In some examples of the method 500 and the apparatus described herein, the root of trust entity may be associated with a pair of keys that include a public key and a private key, and where the root of trust entity receives the first portion of code using the pair of keys.

In some examples of the method 500 and the apparatus described herein, generating the first measurement result further may include operations, features, means, or instructions for hashing the first portion of code to generate a hash.

In some examples of the method 500 and the apparatus described herein, the first measurement result includes a hash.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory array; and
   a controller coupled with the memory array and configured to cause the apparatus to:
      authenticate a root of trust entity as part of a boot-up procedure of a system that includes the root of trust entity;
      receive, by the root of trust entity and as part of the boot-up procedure, a first portion of code associated with a first entity of the system and a second portion of code associated with a second entity of the system based at least in part on authenticating the root of trust entity;
      generate, by the root of trust entity, a first measurement result using the first portion of code associated with the first entity based at least in part on receiving the first portion of code and generate a third measurement result associated with the second entity based at least in part on receiving the second portion of code;
      identify, by the root of trust entity, a second measurement result associated with the first portion of code associated with the first entity based at least in part on generating the first measurement result and a fourth measurement result associated with the second portion of code associated with the second entity based at least in part on generating the third measurement result, wherein the second measurement result is associated with an untampered version of the first portion of code that satisfies a threshold;
      determine, by the root of trust entity as part of the boot-up procedure, whether the first measurement result matches the second measurement result as part of authenticating the first portion of code associated with the first entity and an indication of whether the third measurement result matches the fourth measurement result as part of authenticating the second portion of code associated with the second entity, wherein authenticating the second portion of code associated with the second entity is based at least in part on authenticating the first portion of code associated with the first entity; and
      transmit, by the root of trust entity, an indication of whether the first measurement result matches the second measurement result and an indication of whether the third measurement result matches the fourth measurement result.

2. The apparatus of claim 1, wherein the controller is further configured to cause the apparatus to:
   authenticate, by the root of trust entity, the first portion of code associated with the first entity based at least in part on the first measurement result matching the second measurement result, wherein the indication transmitted by the root of trust entity causes the first portion of code of the first entity to initialize as part of the boot-up procedure of the system.

3. The apparatus of claim 1, wherein the first portion of code of the first entity initializes prior to generating the third measurement result.

4. The apparatus of claim 1, wherein the first portion of code of the first entity initializes after determining whether the third measurement result matches the fourth measurement result.

5. The apparatus of claim 1, wherein the controller is further configured to cause the apparatus to:
   fail to authenticate, by the root of trust entity, the first portion of code associated with the first entity based at least in part on the first measurement result failing to match the second measurement result, wherein the indication transmitted by the root of trust entity causes the first portion of code of the first entity to refrain from initializing as part of the boot-up procedure of the system.

6. The apparatus of claim 1, wherein the controller is further configured to cause the apparatus to:
   retrieve the second measurement result from memory associated with the root of trust entity, wherein identifying the second measurement result is based at least in part on retrieving the second measurement result.

7. The apparatus of claim 1, wherein the controller is further configured to cause the apparatus to:
   generate, by the root of trust entity, the second measurement result using a version of the first portion of code associated with the first entity, wherein identifying the second measurement result is based at least in part on generating the second measurement result.

8. The apparatus of claim 1, wherein the root of trust entity is associated with a pair of keys that comprise a public key and a private key, and wherein the root of trust entity receives the first portion of code and verifies the first portion of code using the pair of keys.

9. The apparatus of claim 1, wherein the controller is configured to generate the first measurement result by being configured to cause the apparatus to:
   hash the first portion of code to generate a hash.

10. The apparatus of claim 1, wherein the first measurement result comprises a hash.

11. A non-transitory computer-readable medium storing code comprising instructions which, when executed by a processor of an electronic device, cause the electronic device to:
    authenticate a root of trust entity as part of a boot-up procedure of a system that includes the root of trust entity;
    receive, by the root of trust entity and as part of the boot-up procedure, a first portion of code associated with a first entity of the system and a second portion of code associated with a second entity of the system based at least in part on authenticating the root of trust entity;

generate, by the root of trust entity, a first measurement result using the first portion of code associated with the first entity based at least in part on receiving the first portion of code and generate a third measurement result associated with the second entity based at least in part on receiving the second portion of code;

identify, by the root of trust entity, a second measurement result associated with the first portion of code associated with the first entity based at least in part on generating the first measurement result and a fourth measurement result associated with the second portion of code associated with the second entity based at least in part on generating the third measurement result, wherein the second measurement result is associated with an untampered version of the first portion of code that satisfies a threshold;

determine, by the root of trust entity as part of the boot-up procedure, whether the first measurement result matches the second measurement result as part of authenticating the first portion of code associated with the first entity and an indication of whether the third measurement result matches the fourth measurement result as part of authenticating the second portion of code associated with the second entity, wherein authenticating the second portion of code associated with the second entity is based at least in part on authenticating the first portion of code associated with the first entity; and transmit, by the root of trust entity, an indication of whether the first measurement result matches the second measurement result and an indication of whether the third measurement result matches the fourth measurement result.

12. The non-transitory computer-readable medium of claim 11, wherein the instructions, when executed by the processor of the electronic device, further cause the electronic device to:

authenticate, by the root of trust entity, the first portion of code associated with the first entity based at least in part on the first measurement result matching the second measurement result, wherein the indication transmitted by the root of trust entity causes the first portion of code of the first entity to initialize as part of the boot-up procedure of the system.

13. The non-transitory computer-readable medium of claim 11, wherein the first portion of code of the first entity initializes prior to generating the third measurement result.

14. The non-transitory computer-readable medium of claim 11, wherein the first portion of code of the first entity initializes after determining whether the third measurement result matches the fourth measurement result.

15. The non-transitory computer-readable medium of claim 11, wherein the instructions, when executed by the processor of the electronic device, further cause the electronic device to:

fail to authenticate, by the root of trust entity, the first portion of code associated with the first entity based at least in part on the first measurement result failing to match the second measurement result, wherein the indication transmitted by the root of trust entity causes the first portion of code of the first entity to refrain from initializing as part of the boot-up procedure of the system.

16. The non-transitory computer-readable medium of claim 11, wherein the instructions, when executed by the processor of the electronic device, further cause the electronic device to:

retrieve the second measurement result from memory associated with the root of trust entity, wherein identifying the second measurement result is based at least in part on retrieving the second measurement result.

17. An apparatus, comprising:

a memory array; and a controller coupled with the memory array and configured to cause the apparatus to:

authenticate a root of trust entity as part of a boot-up procedure of a system that includes the root of trust entity;

retrieve a version of a first portion of code from memory associated with the root of trust entity and stored prior to receiving the first portion of code;

receive, by the root of trust entity and as part of the boot-up procedure, the first portion of code associated with a first entity of the system based at least in part on authenticating the root of trust entity;

generate a first measurement result of the first portion of code associated with the first entity based at least in part on receiving the first portion of code;

generate a second measurement result using the version of the first portion of code after receiving the first portion of code as part of the boot-up procedure and based at least in part on retrieving the version of the first portion of code;

identify, by the root of trust entity, the second measurement result associated with the first portion of code associated with the first entity based at least in part on generating the second measurement result;

determine, by the root of trust entity, whether the first measurement result matches the second measurement result as part of authenticating the first portion of code associated with the first entity as part of the boot-up procedure; and transmit, by the root of trust entity, an indication of whether the first measurement result matches the second measurement result.

18. A method, comprising:

authenticating a root of trust entity as part of a boot-up procedure of a system that includes the root of trust entity;

receiving, by the root of trust entity and as part of the boot-up procedure of the system, a first portion of code associated with a first entity of the system and a second portion of code associated with a second entity of the system based at least in part on authenticating the root of trust entity;

generating, by the root of trust entity, a first measurement result using the first portion of code associated with the first entity based at least in part on receiving the first portion of code and generating a third measurement result associated with the second entity based at least in part on receiving the second portion of code;

identifying, by the root of trust entity, a second measurement result associated with the first portion of code associated with the first entity based at least in part on generating the first measurement result and a fourth measurement result associated with the second portion of code associated with the second entity based at least in part on generating the third measurement result, wherein the second measurement result is associated with an untampered version of the first portion of code that satisfies a threshold;

determining, by the root of trust entity as part of the boot-up procedure, whether the first measurement result matches the second measurement result as part of authenticating the first portion of code associated with the first entity and an indication of whether the third measurement result matches the fourth measurement result as part of authenticating the second portion of code associated with the second entity, wherein authenticating the second portion of code associated with the second entity is based at least in part on authenticating the first portion of code associated with the first entity; and transmitting, by the root of trust entity, an indication of whether the first measurement result matches the second measurement result and an indication of whether the third measurement result matches the fourth measurement result.

* * * * *